United States Patent [19]
Rowe

[11] 3,736,465
[45] May 29, 1973

[54] VOLTAGE SUPPLY ARRANGEMENTS
[75] Inventor: James Howard Rowe, Addlestone, England
[73] Assignee: Plessey Handel und Investments A.G., Zug, Gartenstrasse, Switzerland
[22] Filed: Dec. 29, 1971
[21] Appl. No.: 213,387

[30] Foreign Application Priority Data
Jan. 1, 1971 Great Britain............................35/71

[52] U.S. Cl. ..................315/239, 307/305, 315/240, 315/244
[51] Int. Cl............................................H03k 4/02

[58] Field of Search......................315/172, 176, 239, 315/240, 244; 307/305

Primary Examiner—John Kominski
Attorney—Samuel Scrivener, Jr., N. Douglas Parker, Jr., David S. Scrivener et al.

[57] ABSTRACT

An E.H.T. voltage supply system comprising a relatively high voltage d.c. supply having a relatively high output impedance and low output capacitance, a second voltage supply arranged to charge a storage capacitor, and switch means for discharging the capacitor through the primary winding of a transformer to produce a higher voltage of the secondary winding which is combined with the voltage provided by the first voltage supply means.

6 Claims, 8 Drawing Figures

VOLTAGE SUPPLY ARRANGEMENTS

This invention relates to voltage supply systems. More particularly it relates to E.H.T. (extra high tension) voltage supply systems capable of changing rapidly from one level to another.

According to the present invention a voltage supply system comprises a first voltage supply means for providing on an output terminal of said system a predetermined output voltage, a storage capacitor, a second voltage supply means arranged to charge the storage capacitor, transformer means operatively associated with the capacitor and switch means for discharging said capacitor through a primary winding of the transformer means to produce a voltage change at a secondary winding of the transformer means to which the said output terminal is coupled.

The first voltage supply means may comprise a relatively high voltage d.c. supply having a relatively high output impedance and low output capacitance, and capable of electronic adjustment to two or more different levels one of which may be zero. A system according to the invention is eminently suitable for providing an E.H.T. final anode voltage for dual-phosphor cathode ray tubes of the kind suitable for providing data or other displays including two or more colors.

The color of a dual-phosphor c.r.t. display is determined by the magnitude of the final anode voltage and thus it is necessary to change relatively quickly the final anode voltage typically from 5Kv to 15Kv in a two-color system and between three different voltage levels in a three color system.

The c.r.t. presents to a voltage supply system a capacitive load of the order of a few hundred pica farads and it is therefore necessary to provide a system which will change the energy in a capacitor load of this kind in about $30\mu$ secs. Single low power convention E.H.T. supply system will not provide the necessary energy to effect the voltage changes required in such a short time. It is therefore proposed to utilize a system of the kind according to the invention and as will hereinafter be described in which a first power supply operates at high voltages for long periods but at low power levels in parallel with a second voltage supply which provides or absorbs the energy balance required for fast switching.

The foregoing and other features of the invention will be more readily understood from the following description of some exemplary embodiments of the invention wherein reference is made to the accompanying drawings in which.

Color changes are produced in dual-phosphor cathode ray tubes by changes in final anode supply volts. To produce the full color range, changes of up to 10,000 volts may be necessary.

Final anode capacitance, including strays, may be between about 250 and 1,000 pF, so that corresponding energy changes may be as high as 0.1 Joule. It may be necessary to complete each change in 30 $\mu$s or less, and to produce 5,000 or more cycles of change per second.

These requirements are far outside the capacity of a normal final anode supply unit, which would not normally be loaded in excess of $100\mu A$, nor have an overload capacity in excess of $400\mu A$. Even if its output were switched off during low-voltage periods, and final anode capacitance discharged rapidly, for example, by a high-voltage valve, the number of times such a supply could re-charge 500pF from 5000V to within 5 percent of 15,000V is limited to about 20 times per second.

The present system comprises a two-part arrangement in which the first part provides a steady supply at one or all required levels, while the second part provides energy for the rapid changes.

Figure 1:
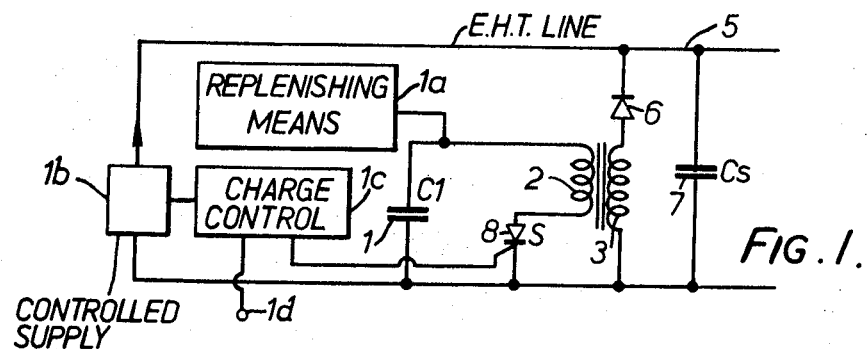
FIG. 1 is a circuit diagram of an arrangement according to the invention.

Referring now to FIG. 1, a rapid upward change, as required for the second part of the arrangement, is provided by the discharge of a capacitor 1, having a capacitance C1 which was previously charged from replenishing means 1a which is merely a d.c. supply source through the primary winding 2 of a step-up transformer 3, the secondary winding of which is connected to the final anode E.H.T. supply line 5 through a suitable rectifier 6. The charged capacitor 1, together with anode capacitance of the c.r.t. represented by capacitor 7 and having a capacitance CS resonates with the leakage inductance L, of the transformer, to produce a sinusoidal current flowing into the capacitor 7. Switching is performed by a silicon controlled rectifier (S.C.R.) 8, which switches off on reversal of the current through it, i.e. after one half cycle of oscillation, reversal of current flow into capacitor 7 being prevented by rectifier 6. Operation of this system as will hereinafter be described in greater detail provides for the superposition of a rapid change is volts on a d.c. supply provided by a unit 1b capable of maintaining the level reached, but alone incapable of reaching that level rapidly.

The steady supply may comprise any suitable controllable high voltage d.c. source having a high output impedance and a low output capacitance. Such a supply although not capable of providing a rapidly changing voltage as required may be adapted to sustain a given voltage once it has been produced by the second part of the system.

In operation of the system control of the output voltage from unit 1b and operation of the S.C.R. is effected by charge control unit 1c which receives on line 1d logic signals when color changes are required and provides output control signals simultaneously to switch the S.C.R. and change the voltage output from unit 1b. Unit 1b may comprise an a.c. supply having potential divider switch control to change its output voltage and control unit 1c may simply comprise a monostable pulse generator fed from a Schmitt trigger responsive to input logic levels.

Reference will now be made to FIG. 2.

Figure 2A:
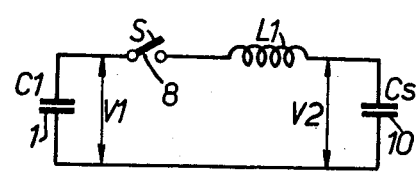
FIG. 2a and FIG. 2b are approximate equivalent circuits of the circuit diagram of FIG. 1.

FIG. 2a is a simplified equivalent circuit in which the capacitor 1 has been referred to the primary winding. The inductance $L_1$ is the leakage inductance referred to the primary winding. Voltage V2 is the actual secondary voltage divided by transformer ratio, n. Resistive losses are ignored.

If, initially, V1, the voltage across capacitor 1 is greater than V2 by V, in one half cycle following closure of switch 8, current will flow from capacitor 1 to the secondary capacitance Cs represented by capacitor 10 until the final value of V2 exceeds the final value of V1 by V. N.B. $Cs = n^2 C_2^2$.

Figure 2B:
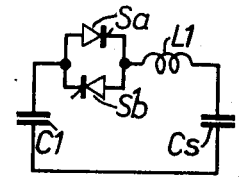
Figure 3:
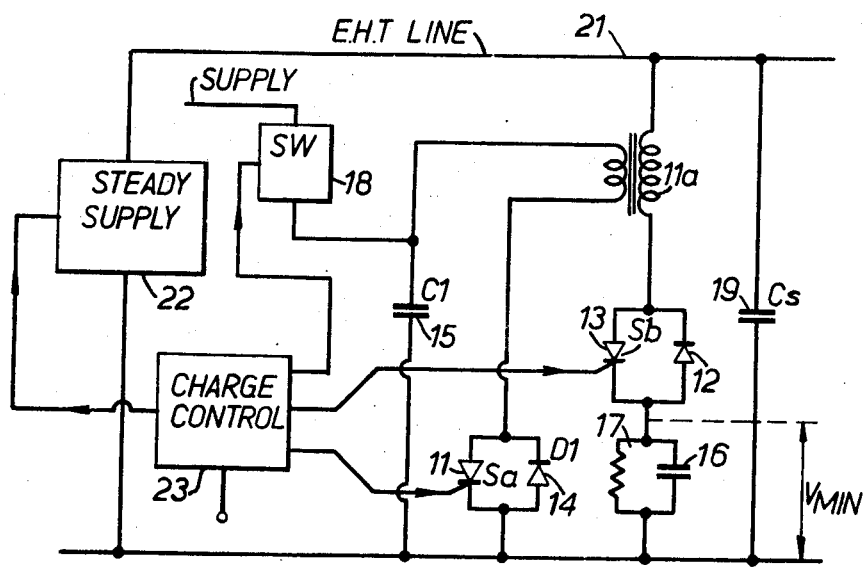
FIG. 3 is a generally schematic circuit block diagram of an alternative system according to the invention.

If suitable, two-directional, fast, high voltage switching means were available, such, for example, Sa and Sb, as shown in FIG. 2b where Sa and Sb represent thyristors, silicon controlled rectifiers (S.C.Rs.) thyratrons, etc., the charge transferred from Cl to Cs by closure of Sa, to produce an increase in output volts, could be transferred back from Cs to Cl, by closure Sb, to produce a decrease in output volts, as required. Thus the complete cycle would be conservative, only circuit losses requiring replenishment. The circuit shown in FIG. 1 is capable of producing an increase in output volts only. Any required decrease must be provided by other means. Energy transferred from capacitor 1 in each cycle must be replenished, between switching, as indicated in FIG. 1. A more efficient form of the circuit is shown in FIG. 3 and involves the resonant transfer of charge from a capacitor 19 representing Cs to capacitor 15, which constitutes Cl as well as from capacitor 15 to capacitor 19, the supply only replenishing circuit losses. In this case the valve or other device used to discharge capacitor 19 to produce a rapid fall in volts is replaced by a high-voltage switching means in series with the transformer secondary switch 13 corresponding to Sb.

Here an upward change is produced by switching on switch 11 corresponding to Sa such that secondary current from transformer 11a flows through rectifier stack 12; a downward step results from switching on a silicon controlled rectifier stack 13, primary current then flowing through rectifier 14 into capacitor 15 corresponding to Cl. The lower limit of final anode volts is determined by Vmin., at which a capacitor 16 is maintained by leakage current through the rectifier stack 12, 13 and a resistor 17 which may be a corona stabilizer, zener diode, avalanche diode stack or other stabilizing device. A switching unit 18 via which the charge on the capacitor is replenished from a d.c. supply not shown, is kept open during high-voltage periods, and closed only after the charge has been returned from capacitor 19 which corresponds to Cs to capacitor 15, so that it may be replenished to the stable supply only. This circuit is given for illustrative purposes. It may not be suitable for output voltages much in excess of 1000 volts, since suitable devices for the duty of switch 13 are not, at present, available in small or economic sizes but as they become available its application can be extended.

It can be seen that the E.H.T. line 21 is fed from a stable d.c. steady supply 22 and that switch control trigger pulses are derived from change control box 23 to change the steady supply voltage synchronously as S.C.Rs 11 and 13 are switched. Logic level control signals being applied on line 23a.

Referring to FIG. 2 again, it has been shown that if switch 8 is closed for one half period of the natural oscillatory frequency of circuit $L_1$, Cl, Cs, when V1 exceeds V2 by V, charge will swing from Cl to Cs until V2 exceeds V1 by V. On the next half-period closure, the condition will revert to the original state. Thus, in the absence of circuit losses, V2 may be caused to swing indefinitely between any two chosen values. It is also clear that, since the change is sinusoidal and not exponential, both the states and the time taken between states are clearly defined and, to some extent, controllable, i.e. the changes are not asymptotic. In addition, the time is not dependent on the magnitude of change. Periods as short as 30 microseconds are quite feasible in practice.

Since large changes of final anode volts are essential to the two-phosphor method of color control the gain of the deflection amplifiers must be varied with E.H.T. to compensate for the changes in deflection sensitivity. One method of achieving such variation forms the subject of our co-pending British Patent Application No. 7710/70, and in a magnetic deflection system where deflection sensitivity $\alpha\ 1/\sqrt{E.H.T.}$ means are provided to sense the E.H.T. voltage and control the deflection amplifier sensitivity in accordance with the $\sqrt{E.H.T.}$ voltage so that beam deflection is not variable with E.H.T. In an electrostatic system similar compensation may be effected in accordance with E.H.T. voltage changes. Since by this means, deflection sensitivity is rendered independent of final anode volts, a rather higher level of supply ripple than normal may be accepted. Consequently the supply which provides the steady load current may be simpler than that used in other applications, and a circuit similar to that of FIG. 1 may be used, differing only from that described above in that a small charge is introduced to capacitor 7 very frequently, and that a simple d.c. feedback circuit controlling the replenishment means may be used to stabilize the E.H.T. line to each output level selected. If C2 were 500pF, replenished 10,000 times per second, feeding a steady current of 100μA to the load, ripple would only be 20 volts and no further smoothing would be required.

Figure 4:
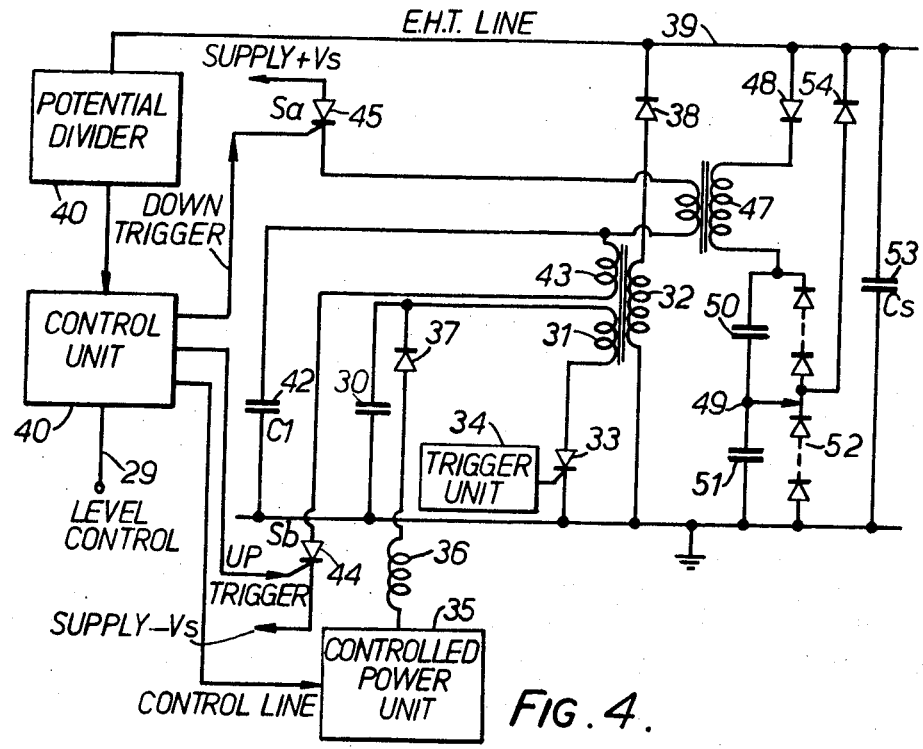
FIG. 4 is a generally schematic circuit block diagram of a further system according to the invention utilizing two transformers.

Another embodiment of the invention, which permits both upward and downward fast changes, is illustrated in FIG. 4. The first supply means comprises capacitor 30, replenished by power unit 35 via inductance 36 and rectifier 37, and discharged at regular intervals through primary 31 of transformer 32 by means of silicon controlled rectifier 33 under the control of an oscillator trigger unit 34. The output from the transformer secondary winding feeds E.H.T. line 39 via rectifier 38. Control of the E.H.T. level is maintained by feedback via potential divider 40 to level control unit 41. In the control unit the fedback signal is compared with a voltage whose value is determined by an incoming level control signal 29 to produce a control signal by means of which power unit 35 is corrected. Since the available output from the first voltage supply means is small, it cannot alone charge or discharge the total load capacitance 53 rapidly.

The second or rapid supply means derives its energy from capacitor 42. To increase output rapidly, silicon controlled rectifier 44 closes, to discharge capacitor 42 through the second primary winding 43 of transformer 32. The resulting current pulse passes through rectifier 38 to E.H.T. line 39. Capacitor 42 is at the same time charged, via thyristor 44 and the primary, to −Vs. The magnitude of the charge delivered to the E.H.T. line is determined by the value of capacitor 42, the values of +Vs and −Vs, the ratio of transformer 32, and the value of total capacitance 53. The following rapid decrease is produced by triggering thyristor 45 which discharges capacitor 42, from its level at −Vs to +Vs, through the primary of transformer 47. This draws a charge from the E.H.T. line through rectifier 48 into the capacitors 50 and 51 of the stabilized voltage reference stack 49 which comprises cascades avalanche diodes. The level to which capacitors 50 and 51 are charged, which corresponds to the highest E.H.T. level required, is determined by the series connection of avalanche rectifiers 52 of the stack 49 which number about 25 for a maximum E.H.T. of 15,000 volts. Capacitors 50 and 51 are large enough to retain a voltage very close to 15,000 volts (in the present case) for a considerable time. Consequently rectifier 48 only conducts the very small avalanche current taken by rectifiers 52 except when a voltage pulse is applied by transformer 47. The connection to the intermediate level of the reference stack via rectifier 54 clamps the E.H.T. line to the lower chosen E.H.T. level, preventing downward overswing. In the same manner rectifier 48 clamps the E.H.T,. line to the upper level when switched upward.

Simultaneously with each switching the control unit 41 transmits to the controlled power unit 35, via the control line, the appropriate correction for the new output voltage.

If, for any reason, the equipment is required to stand for a very long period at the lower E.H.T. level the charges on capacitors 50 and 51, and possibly on capacitor 42 may fall. If such operation is required a means of maintaining both charge levels may be necessary. This means is not shown. One possible method, suitable for color display use, is to arrange for the controlling computer or other external control means to command a brief up-charge about 10 to 20 times per second. In a two-color display this may be made to present a test symbol at the edge of the cathode ray tube screen to indicate that the second color is operational.

Figure 5:
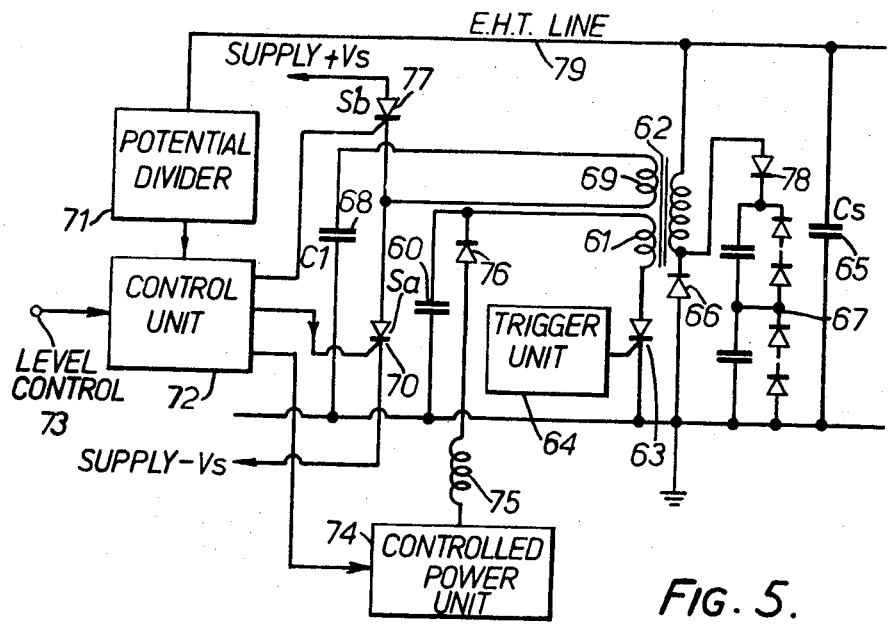
FIG. 5 is a generally schematic circuit block diagram similar to FIG. 4, but utilizing one transformer only.

FIG. 5 shows a further arrangement very similar to FIG. 4, but utilizing a single transformer. The first supply means operates exactly as in FIG. 4. The rapid change up-switching, operated by the discharge of capacitor 68 from +Vs to −Vs through primary winding 69 of transformer 62, by means of thyristor 70, delivers a change through rectifier 66 and the transformer secondary to the E.H.T. line. The following down-switching results from triggering thyristor 77 to oppositely charge capacitor 68 by a reversed current through primary 69. The reversed secondary current flows through rectifier 78 into the capacitance of reference stack 67. This method may only be suitable for slower or less-precise operation than that of FIG. 4, since residual oscillatory energy in the transformer after switching may cause some following conduction of rectifier 78 after an up-switching, resulting in some loss of volts from the E.H.T. line.

Figure 6:
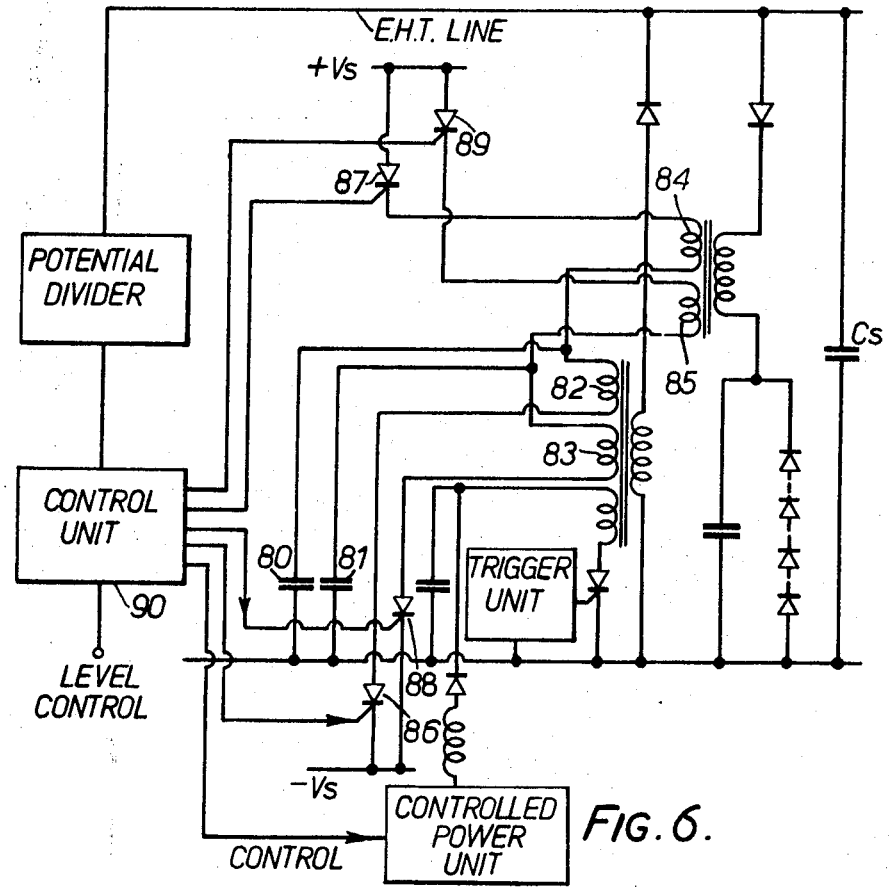
FIG. 6 is a generally schematic circuit block diagram of a system for three level switching.

FIG. 6 shows a further application, similar to FIG. 4, but permitting the selection of a third voltage level, The first supply means operates as in FIG. 4, but responds to three controlled levels. The second supply means is divided into two parts, capacitors 80 and 81 providing the stored energy to produce the rapid changes, in conjunction with two separate primary windings on both transformers, 82, 83, 84 and 85. Energy stored in capacitor 80 is switched by thyristor 86, through primary 82 to produce a part switch upward, or by thyristor 87 through primary 84 to produce a part switch downward. The second part of the total upward switching is by means of thyristor 88 and primary 83. The second part of the total downward switching is by means of thyristor 89 and primary 85. A total upward step from level 1 (the lowest) to level 3 (the highest) would be performed by triggering thyristors 86 and 88 either simultaneously or sequentially, as required. A total switch downward would be performed similarly by switching thyristors 89 and 87 simultaneously or in sequence. Control unit 90 is arranged to produce three control states instead of two. Extensions to greater numbers of steps would be by further sub-dividing capacitor C1 (80 and 81) into the required number of parts.

Figure 7:
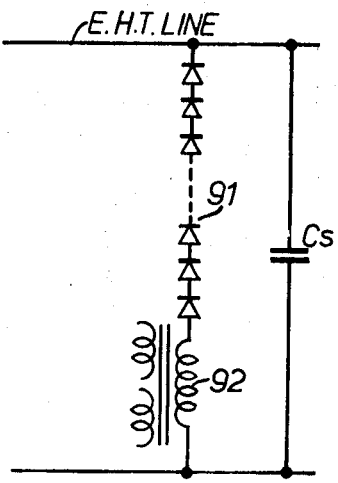
FIG. 7 is a partial circuit diagram of a down switching arrangement suitable for use in a system according to the invention.

FIG. 7, shows a further arrangement for producing a downward step. A stack of avalanche rectifiers 91, as before, but without parallel capacitance, has a number of rectifiers sufficient to sustain the maximum E.H.T. level required. This is driven into heavy avalanche current by transformer 92 to produce a downward switching. In this case transformer 92 may also provide the up-switching pulse. This arrangement may be limited in frequency of change or magnitude of change by the power limitations of rectifiers 91.

What we claim is:

1. A display system utilizing a cathode ray tube the final anode E.H.T. voltage of which is required to be variable in steps, the said E.H.T. voltage being provided by a voltage supply system comprising a first variable voltage supply feeding an output terminal of said supply system and capable of providing continuously current for the final anode of the cathode ray tube, control signal producing means operatively associated with said first variable voltage supply for changing its output voltage in steps, a second variable voltage supply which includes transformer means a secondary winding of which is coupled to said terminal, storage capacitor means, a d.c. for charging said storage capacitor means and switch means responsive to signals deriving from said control signal producing means for discharging said capacitor means through a winding of said transformer, thereby to alter the voltage of said second variable voltage supply rapidly and contemporaneously with said first variable voltage supply, whereby the said E.H.T. voltage is changeable rapidly due to operation of said second variable voltage supply to a level thereafter sustained by said first variable voltage supply.

2. A display system as claimed in claim 1 wherein the transformer means comprises a double wound transformer having a primary winding and a secondary winding and wherein the capacitor means comprises a capacitor charged by the d.c. supply and dischargeable through the primary winding of said transformer by operation of a semiconductor switch in response to signals from the control signal producing means for increasing the said E.H.T. voltage and a further semiconductor switch and a further capacitor serially connected with the secondary winding of said transformer said further switch being responsive to further signals deriving from the control signal producing means for decreasing the said E.H.T. voltage.

3. A display system as claimed in claim 1 wherein the storage capacitor means comprises a plurality of capacitors and wherein the switch means comprises a plurality of switchable semiconductor devices one for each capacitor and wherein the transformer means comprises a plurality of primary windings one for each capacitor and a plurality of d.c. sources constituting the said d.c. supply the capacitors being arranged to be charged to the potential of said d.c. sources one capacitor to each said source and selectively discharged through their associated primary windings in response to operation of their associated semiconductor switches consequent upon the application thereto of predetermined signals deriving from the said control signal producing means.

4. A display system as claimed in claim 3 comprising an additional primary winding and wherein the switch means comprises an additional switchable semiconductor device one of said plurality of capacitors being dischargeable through said additional primary winding in response to operation of said additional switchable semiconductor device consequent upon the application thereto of a signal from the said control signal reducing means.

5. A display system as claimed in claim 3 wherein one of said plurality of capacitors is connectable to one or another of said d.c. sources in accordance with the operation of a further switchable semiconductor device responsively to the application therto of a signal from the said control signal producing means.

6. A display system as claimed in claim 5 comprising a plurality of switchable rectifier devices serially connected with a secondary winding of said transformer means whereby rectification of said E.H.T. voltage is produced.

* * * * *